United States Patent
Tischler et al.

(10) Patent No.: US 11,752,927 B2
(45) Date of Patent: Sep. 12, 2023

(54) EXTERNAL CLADDING COMPONENT OF OR FOR A VEHICLE AND VEHICLE COMPRISING SUCH AN EXTERNAL CLADDING COMPONENT

(71) Applicant: MOTHERSON INNOVATONS COMPANY LIMITED, London (GB)

(72) Inventors: Raphael Tischler, Ettenheim (DE); Markus Meier, March (DE); Benjamin Sepp, Gengenbach (DE); Richard Mohrmann, Gundelfingen (DE); Jochen Walz, Eichstetten (DE)

(73) Assignee: MOTHERSON INNOVATIONS COMPANY LIMITED, London (GB)

( * ) Notice: Subject to any disclaimer, the term of this patent is extended or adjusted under 35 U.S.C. 154(b) by 0 days.

(21) Appl. No.: 17/519,043

(22) Filed: Nov. 4, 2021

(65) Prior Publication Data

US 2022/0154909 A1 May 19, 2022

(30) Foreign Application Priority Data

Nov. 13, 2020 (EP) .................. 20 207 639

(51) Int. Cl.
*B60Q 1/26* (2006.01)
*B60Q 1/00* (2006.01)

(52) U.S. Cl.
CPC ......... *B60Q 1/2619* (2013.01); *B60Q 1/0064* (2013.01); *B60Q 2400/00* (2013.01); *B60Q 2400/40* (2013.01); *B60Q 2400/50* (2013.01)

(58) Field of Classification Search
CPC .... B60Q 1/2619; B60Q 2400/00; B60Q 1/24; B60Q 1/245; B60Q 1/247; B60Q 1/24249; F21W 2104/00
See application file for complete search history.

(56) References Cited

U.S. PATENT DOCUMENTS

| | | | |
|---|---|---|---|
| 5,709,453 A | 1/1998 | Krent et al. | |
| 7,607,809 B2 * | 10/2009 | Misawa | B60Q 1/2669 362/504 |

(Continued)

FOREIGN PATENT DOCUMENTS

| | | | | |
|---|---|---|---|---|
| DE | 10 2006 014 561 B3 | 10/2007 | | |
| DE | 102018207270 A1 * | 11/2019 | | B60Q 1/18 |

(Continued)

OTHER PUBLICATIONS

Machine Translation Gunther REf (Year: 2019).*
European Search Report issued by the European Patent Office in EP 20 20 7639 dated Mar. 8, 2021.

*Primary Examiner* — Robert J May
(74) *Attorney, Agent, or Firm* — Ursula B. Day

(57) ABSTRACT

An external cladding component of or for a vehicle, by which information can be displayed, is disclosed. The cladding component has a base body with a first surface and a second surface, the second surface facing to the exterior of the cladding component, and an aperture running through the base body, and a light source providing a beam of light, wherein the light source is at least partially arranged within the aperture and protrudes the second surface, or the beam of light is running through the aperture, wherein the beam of light at least partially impinges on an illumination section provided by the second surface.

14 Claims, 5 Drawing Sheets

(56) References Cited

U.S. PATENT DOCUMENTS

| | | |
|---|---|---|
| 9,593,820 B1 | 3/2017 | Salter et al. |
| 2006/0104075 A1 | 5/2006 | Misawa |
| 2016/0258591 A1 | 9/2016 | Salter et al. |
| 2019/0080637 A1 | 3/2019 | Kanaguchi et al. |

FOREIGN PATENT DOCUMENTS

| | | |
|---|---|---|
| JP | 2005 112262 A | 5/2005 |
| WO | WO 2017/153163 A1 | 9/2017 |

* cited by examiner

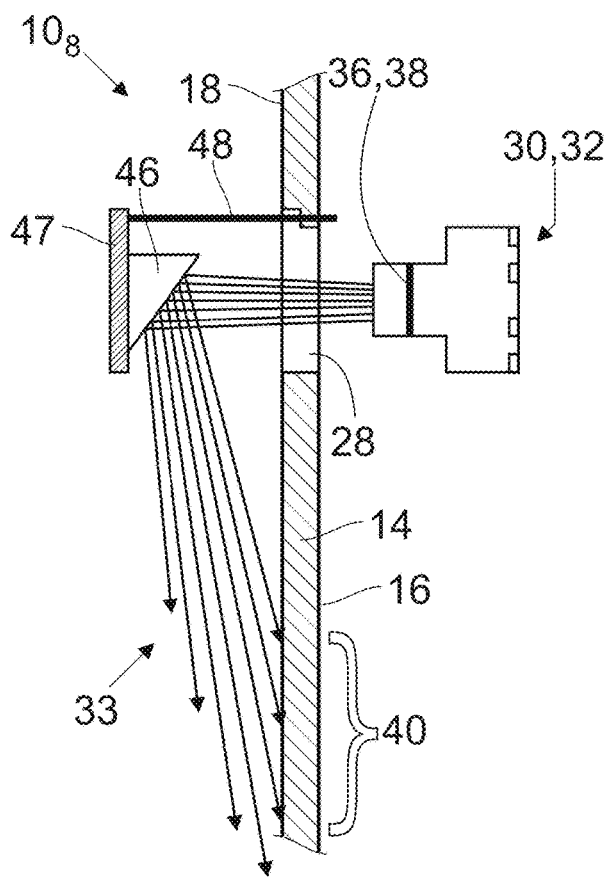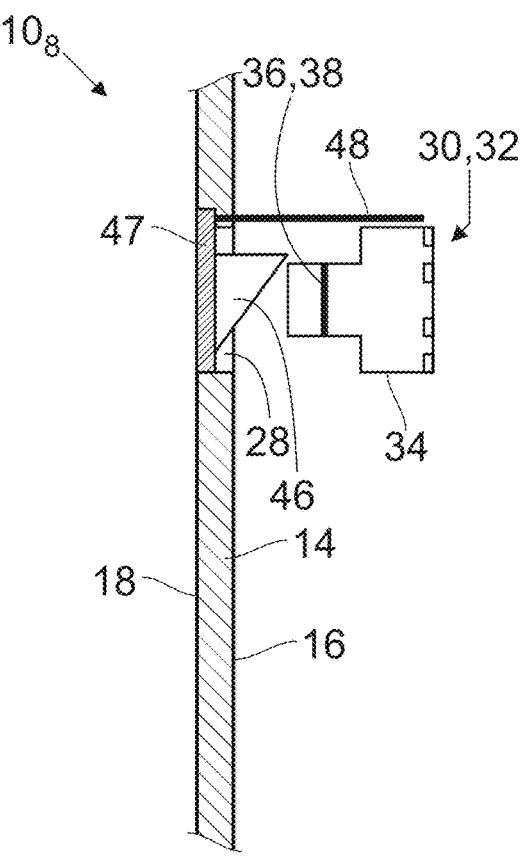
Fig.8A  Fig.8B
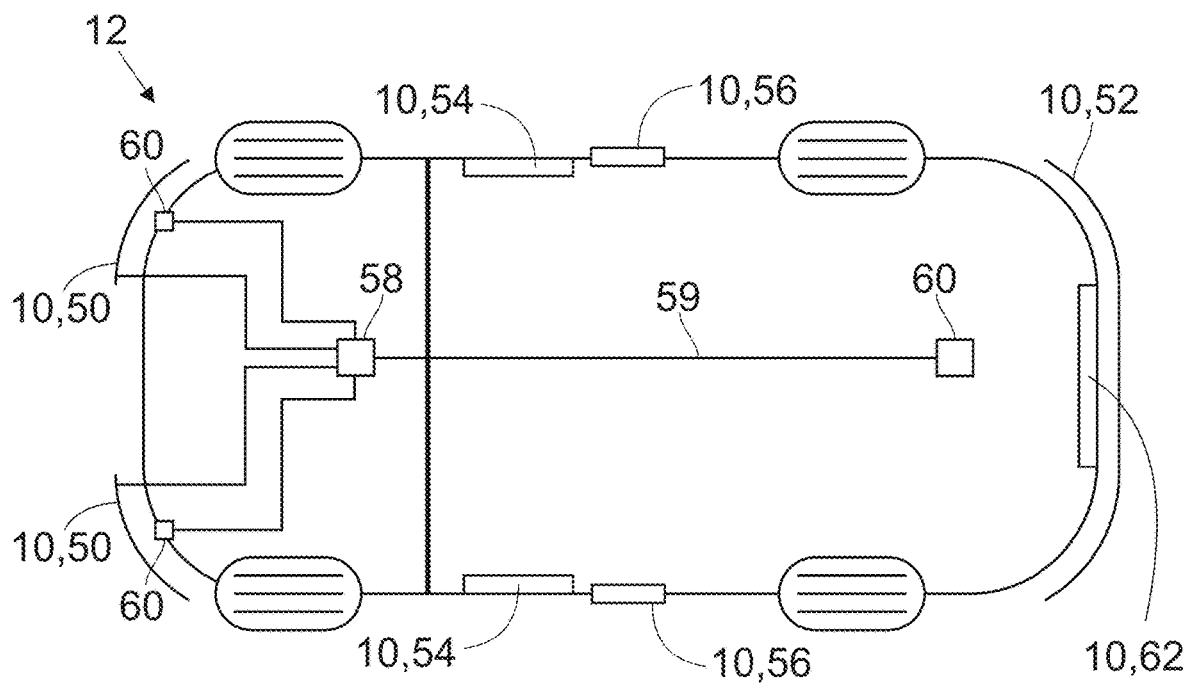
Fig.9

EXTERNAL CLADDING COMPONENT OF OR FOR A VEHICLE AND VEHICLE COMPRISING SUCH AN EXTERNAL CLADDING COMPONENT

CROSS-REFERENCES TO RELATED APPLICATIONS

This application claims the priority of European Patent Application Ser. No. 20 207 639.4 filed Nov. 13, 2020 pursuant to 35 U.S.C. 119(a)-(d), the subject matter of which is incorporated herein by reference.

BACKGROUND OF THE INVENTION

The present invention is directed to an external cladding component of or for a vehicle. Moreover, the present invention relates to a vehicle comprising such an external cladding component.

External cladding components are playing an increasingly important role in the exterior design of a vehicle and are usually flat components. Non-exhaustive examples of external cladding components are front grilles, side skirts, bumpers, tailgates and spoilers. Typically the external cladding components are made by injection molding, however, within the present disclosure the external cladding components are not limited to injection molded parts and can for example be made of metal, glass or the like.

External cladding components form a significant part of the outer surface of a given vehicle. With increasing digitalization and electrification of modern vehicles, the outer surface is used more and more as a display for showing information. Such information may for example be that the vehicle control unit has identified a potentially dangerous situation. Such a dangerous situation may be that a collision with a pedestrian is highly likely. In this situation, at least a part of the outer surface could display a red flash to optically warn the pedestrian and to defuse the situation. An acoustical signal may thus become superfluous.

External cladding components capable of displaying such information typically comprise a transparent plastic similar to a headlight cover. However, transparent plastics often do not fulfill the mechanical requirements for external cladding components, in particular regarding rigidity and scratch resistance. As a consequence, it is not preferred to manufacture the entire external cladding component of a transparent plastic. The section of the external cladding component that is intended for displaying information has therefore to be made of a different plastic as compared to the remaining external cladding component. Such external cladding components are therefore fairly inflexible and expensive to produce.

SUMMARY OF THE INVENTION

An aspect of one embodiment of the present invention is to present an external cladding component by which information can be displayed and which can be manufactured at reduced cost as compared to external cladding components known from the prior art. Furthermore, another embodiment of the present invention has the object to provide a vehicle comprising such an external cladding component.

This and other aspects of the present invention are realized by the features specified in the independent claims. Advantageous embodiments are the subject of the dependent claims.

According to an embodiment, the external cladding component of or for a vehicle comprises
a base body having
first surface and a second surface, the second surface facing to the exterior of the external cladding component, and
an aperture running through the base body, and
a light source providing a beam of light, wherein
the light source is at least partially arranged within the aperture and protrudes from the second surface, or
the beam of light is running through the aperture,
wherein the beam of light at least partially impinges on an illumination section provided by the second surface.

According to the present disclosure, the external cladding component is equipped with a light source that may be fastened to the external cladding component or at least interact with the external cladding component. Due to the fact that the external cladding component comprises an aperture or opening, the beam of light emitted by the light source can impinge on the second surface that is the visible face of the external cladding component. The area in which the beam of light is impinging on the second surface is referred to as the illumination section. Thus an observer can take note of the illumination section. Depending on what kind of color, pattern or picture is displayed in the illumination section, certain information can be transmitted. The light source may be designed such that only one illumination section is generated. However, the light source may also be capable of providing a plurality of individual illumination sections.

Next to the arrangement of a light source relative to the base body of the external cladding component, the only main constructional modification needed is the aperture or opening in the base body. It is not necessary to use a specific material for the base body. In particular, it is not necessary to use a transparent material such as glass or a transparent plastic. The modifications necessary as compared to an existing external cladding component are thus fairly small. Moreover, it is not necessary to provide the second surface with a specific surface quality. As a consequence, the external cladding component according to the present disclosure can be implemented with little effort.

In another embodiment, the beam of light forms an angle of impact with the illumination section that is bigger than 0° and smaller than 360°, preferably between 1° and 90° and most preferably between 10° and 80°. The beam of light typically leaves the light source by an angle of radiation. The angle of impact could be defined as the angle formed between the illumination section and the angle of radiation in a plane perpendicular to the second surface within the illumination section. In case the angle of impact was 0° or 360°, the beam of light would run parallel to the illumination section and never impinge on the latter. In case the angle of impact is bigger than 10° the light yield inside the illumination section is sufficient such that the light impinging on the illumination section is clearly visible by an observer.

A further embodiment of the external cladding component comprises a curvature which is
at least partially extending into the illumination section or
arranged outside the illumination section.

Usually, external cladding components comprise curvatures which may partially or completely extend into the illumination section. Alternatively, the curvature is located outside the illumination section and the illumination section as such is plane. In both cases the curvature is influencing the angle of impact. In case the curvature extends into the illumination section, there may be distortions in the distribution of the light impinging on the illumination section due to the changing angle of impact within the illumination section. This effect may be equalized by specific measures such that an even illumination is reached in spite of the curvature inside the illumination section.

According to another embodiment, the external cladding component comprises protrusions on which the beam of light at least partially impinges. Such protrusions could e.g. be part of the radiator grille. However, they could also be arranged on the second surface in small scale, e.g. for generating line patterns. The protrusions could be designed in a way that they partially shadow the illumination section thereby emphasizing the line patterns. The protrusions could also be provided by a higher reflectivity compared to the remaining illumination section. The amount of light reflected by the protrusions is thereby increased.

In a further embodiment, the aperture is arranged inside a recess of the external cladding component. Recesses are commonly present in external cladding components. The aperture can be arranged offset from the illumination section. There is no need to deflect the beam of light to make sure that it impinges on the illumination section.

In another embodiment, the external cladding component comprises an optical unit for deflecting the beam of light. In this embodiment the illumination section can be located on the second surface almost regardless of the particular geometry of the external cladding component. In particular there is no need to arrange the aperture inside a recess. The optical unit therefore increases the size of the second surface that can be illuminated. Beyond that the position of the light source can be chosen with a higher flexibility.

A further embodiment is characterized in that the external cladding component comprises a moving unit for moving the optical unit relative to the light source. By means of the moving unit the illumination section can be changed. Moreover, the light yield of the beam of light impinging on the illumination section can be varied. The illumination section thus does not appear static to the observer but dynamic. Dynamic lights usually attract the attention of an observer more easily compared to static lights which may be useful in case of a dangerous situation.

According to another embodiment, the external cladding component comprises a lid for closing the aperture. The lid prevents dust and other contaminants from entering into the external cladding component. The light source can be protected from outer influences.

In a further embodiment the lid is movable by the moving unit. In this embodiment the movement of the optical unit and the moving unit is synchronized. There is no need to provide the external cladding component with a further unit for opening and closing the aperture.

In another embodiment, the external cladding component comprises color changing means for changing the color of the beam of light. Such means could be color filters. It is also possible to use a number LEDs as the light source, at least one for each primary color. By mixing the light emitted by the LEDs the color of the beam of light can also be changed. The ability to change the color of the beam of light increases the amount of information that can be displayed on the illumination section. As an example, the current charge condition of the batteries of an electric vehicle can be displayed on the second surface such that the driver is informed before starting the vehicle. When the illumination section is green, the charge condition is fine, when yellow the battery condition is intermediate and when red the batteries should be recharged.

A further embodiment is characterized in that the light source is integrated into a projector or a beamer. In this embodiment it is possible to show a plurality of pictures or to show a video sequence. The amount of information that can be displayed on the illumination section is significantly increased.

Another aspect of the invention is directed to a vehicle comprising an external cladding component according to one of the preceding embodiments. The technical effects and advantages as discussed with respect to the present external cladding component also apply to the vehicle. Briefly, it is possible to use the second surface of the external cladding component to display information without the need to fundamentally change the design of the external cladding component.

According to another embodiment, the vehicle comprised a control unit by which the light source and/or the projector and/or the moving unit can be controlled. The driver or the owner of the vehicle may customize the way to illuminate the illumination section and define respective scenes. As an example when the driver opens the car by the remote key, the illumination section may be illuminated by a smiley to greet the driver.

In a further embodiment, the vehicle comprises a number of sensors that determine the current status of the vehicle, wherein the light source and/or the projector and/or the moving unit are controlled depending on the determined status of the vehicle. The sensors may control the surroundings of the vehicle. In case a pedestrian is detected which may collide with the vehicle an illumination section that is visible to the pedestrian could be illuminated in red or flashing red or as a red flashing exclamation mark to draw the attention of the pedestrian to the vehicle and prevent the potential collision.

BRIEF DESCRIPTION OF THE DRAWINGS

Other features and advantages of the present invention will be more readily apparent upon reading the following description of currently preferred exemplified embodiments of the invention with reference to the accompanying drawing, in which:

FIG. 8A is a principle sectional view through a seventh embodiment of an external cladding component according to the present disclosure in a first state, FIG. 8B is a principle sectional view through a seventh embodiment of an external cladding component according to the present disclosure in a second state, FIG. 9 is a principle top view of a vehicle comprising one or more of the external cladding components shown in the previous figures.

DETAILED DESCRIPTION OF PREFERRED EMBODIMENTS

Figure 1:
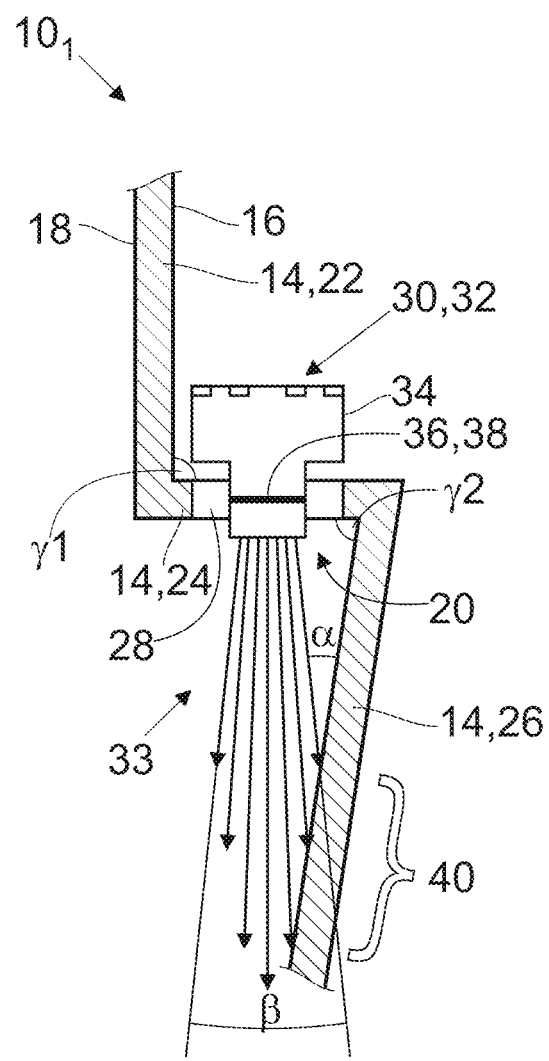
FIG. 1 is a principle sectional view through a first embodiment of an external cladding component according to the present disclosure.

In FIG. 1, a first embodiment of an external cladding component $10_1$ of a vehicle 12 (see FIG. 8) is shown by a principle sectional view. The external cladding component $10_1$ comprises a base body 14 having a first surface 16 and a second surface. The first surface 16 is facing into the interior of the external cladding component $10_1$ while the second surface 18 is facing to the exterior. Thus the second surface 18 is the visible face that can be noted by an observer looking at the vehicle 12.

The base body 14 forms a recess 20. To form the recess 20 the base body 14 comprises a first section 22, a second section 24 and a third section 26. The first section 22 is enclosing a first angle γ1 of around 90° with the second section 24 while the second section 24 is enclosing a second angle γ2 with the third section 26, the second angle γ2 being smaller than the first angle γ1. The first angle γ1 may significantly differ from 90°. As external cladding components $10_1$ are usually curved it may not be possible to clearly define the first section 22, the second section 24 and the third section 26 and thus the first angle γ1 and the second angle γ2. However, the underlying concept is analogously applicable to curved cladding components $10_1$.

An aperture 28 completely running through the base body 14 is located inside the recess 20 and inside the second section 24 of the base body 14. Moreover, the external cladding component $10_1$ comprises a light source 30 that is fastened to the base body 14 by fastening means that are not shown. Alternatively the light source 30 can be fastened to parts of the vehicle 12 such as the chassis. The light source 30 comprises in total four LEDs, 32 each of which emit light of a different color such that a beam of light 33 is generated. However, another number of LEDs 32 may also be employed. Depending on the application only one LED 32 may be sufficient. The light source 30 is part of a projector 34 that further comprises color changing means 36 for changing the color of the beam of light 33, in this case a color filter 38. In the embodiment shown in FIG. 1, the color of the beam of light 33 could be changed by mixing the light of the four LEDs 32 and/or by the color filter 38. Depending on the properties of the projector 34 the colors may be changed without the need of a color filter 38.

The projector 34 is arranged such that it protrudes the aperture 28 and partially extends beyond the second surface 18. The gap between the projector 34 and the second section 24 may be filled by a filling material (not shown) which may be transparent or opaque. In this case the aperture 28 is closed. In the first embodiment of the external cladding component $10_1$ the projector 34 is arranged perpendicular to the second section 24 and the aperture 28. The beam of light 33 leaves the projector 34 by an angle of radiation β and partially impinges on the second surface 18 forming an illumination section 40. In other words: The illumination section 40 is the part of the second surface 18 illuminated by the beam of light 33. In this case the illumination section 40 is plane. The illumination section 40 forms an angle of impact α with the beam of light 33 that is in this case about 15°. The angle of impact α is the angle formed between the illumination section 40 and the angle of radiation β. The smaller the angle of impact α, the smaller the light yield or the light intensity of the beam of light 33 in the illumination section 40.

The illumination section 40 is visible to an observer. Depending on the performance of the projector 34 it may only be possible to change the color of the beam of light 33 such that the illumination section 40 is e.g. illuminated in green or red. However, it may be possible to project certain patterns such as letters or pictures on the second surface 18. Video-sequences may also be projected on the second surface 18.

Figure 2:
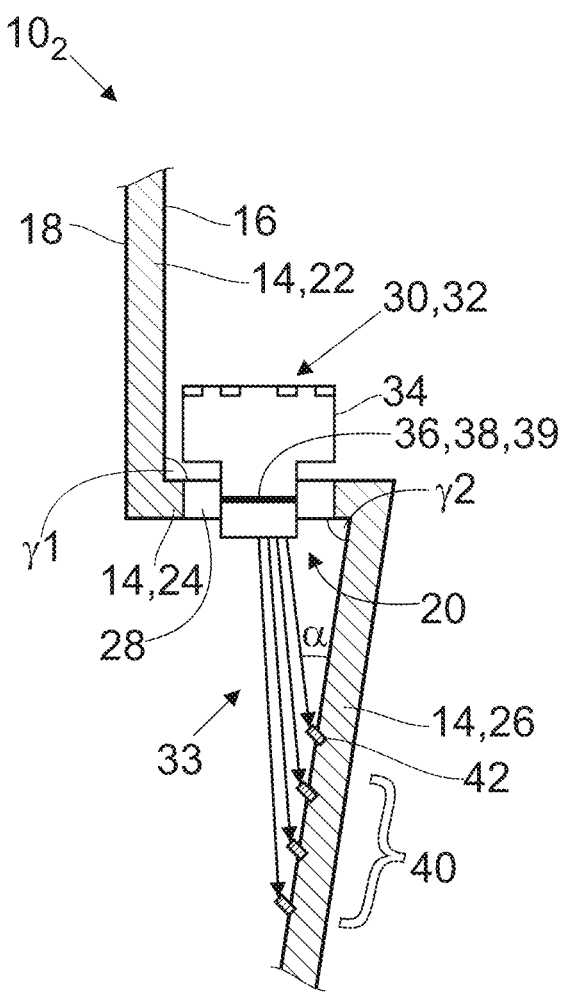
FIG. 2 is a principle sectional view through a second embodiment of an external cladding component according to the present disclosure.

FIG. 2 shows a principle sectional view of a second embodiment of the external cladding component $10_2$ of the present disclosure. The basic construction of the second embodiment of the external cladding component $10_2$ is the same as of the first embodiment of the external cladding component $10_1$. However the second surface 18 of the second embodiment of the external cladding component $10_2$ comprises a number of protrusions 42 located inside the illumination section 40. The protrusions 42 may have a linear or undulated or any other contour. The angle of impact α in the protrusions 42 is different from the angle of impact α inside the remaining illumination section 40. Beyond that the protrusions 42 may shadow parts of the illumination section 40 so that the observer perceives a certain pattern, e.g. a line pattern. However, in the second embodiment the projector 34 comprises a mask 39 that is designed such that the light beam 33 only impinges on the protrusions 42 while the rest of the second surface 18 remain dark.

The mask 39 is able to shadow parts of the light beam 33 such that sharp edges are generated that demarcate illuminated areas from shadowed areas of the light beam. The use of the mask 39 is not limited to the second embodiment but may also be used in the other embodiments shown.

The reflectivity of the protrusions 42 may be higher compared to the remaining illumination section 40. This pattern is only produced by the surface design of the second surface 18 and not by the light source 30 or the projector 34. Thus the design of the projector 34 and the light source 30 can be kept simple.

Figure 3:
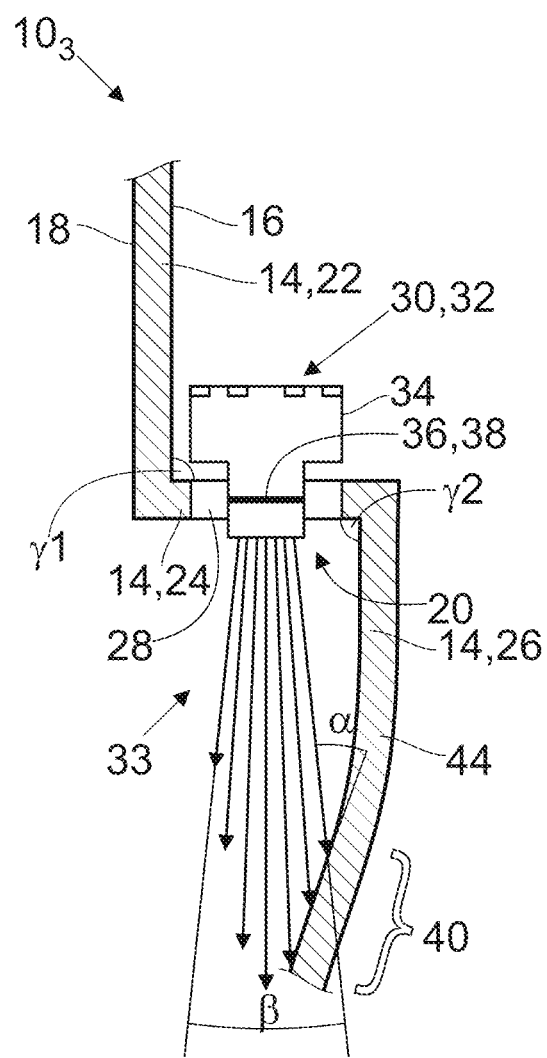
FIG. 3 is a principle sectional view through a third embodiment of an external cladding component according to the present disclosure.

FIG. 3 shows a principle sectional view of a third embodiment of the external cladding component $10_3$ of the present disclosure. The basic construction of the second embodiment of the external cladding component $10_3$ is the same as of the first embodiment of the external cladding component $10_1$. In this case the second surface 18 comprises a curvature 44 located in the third section 26. The first angle γ1 and the second angle γ2 are equal. The curvature 44 does not extend into the illumination section 40 such that the illumination section 40 is planar. The curvature 44 is arranged adjacent to the illumination section 40. However, as the curvature 44 is influencing the orientation of the illumination section 40 the curvature 44 is influencing the angle of impact α of the illumination section 40.

Figure 4:
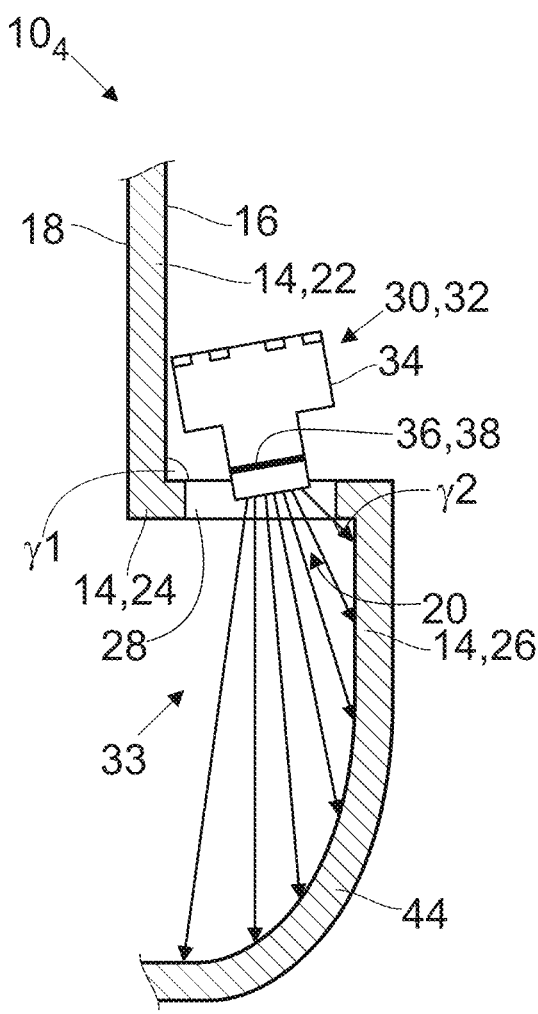
FIG. 4 is a principle sectional view through a fourth embodiment of an external cladding component according to the present disclosure.

FIG. 4 shows a fourth embodiment of the external cladding component $10_4$. In this case the curvature 44 is extending into the illumination section 40. In this case the angle of impact α (not shown in FIG. 4) is changing within the illumination section 40 which influences the light yield of the beam of light 33 within the illumination section 40. As a consequence the light distribution within the illumination section 40 is variable. To reach an acceptable angle of impact α, the projector 34 and thus the light source 30 are arranged with a certain inclination relative to the second section 24 and the aperture 28. As a result the illumination section 40 (not explicitly shown in FIG. 4) extends to the intersection between the second section 24 and the third section 26.

Figure 5:
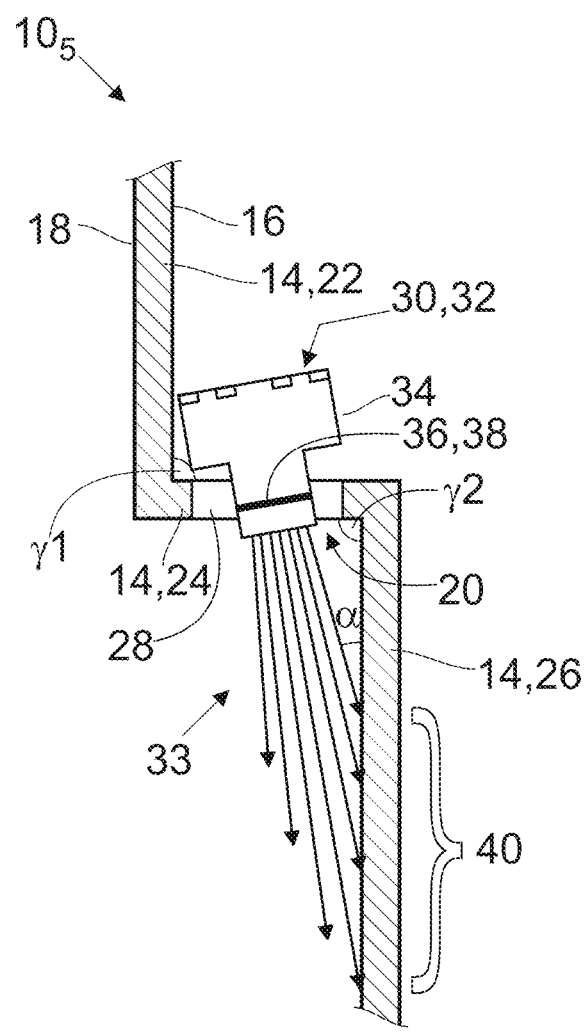
FIG. 5 is a principle sectional view through a fifth embodiment of an external cladding component according to the present disclosure.

FIG. 5 shows a principle sectional view of a fifth embodiment of the external cladding component $10_5$ of the present disclosure. The fifth embodiment of the external cladding component $10_5$ shows a high degree of resemblance with the first embodiment, however, the first angle γ1 and the second angle γ2 are equal and the third section 26 does not comprise any curvature 44. As in the fourth embodiment, the projector 34 and thus the light source 30 are arranged with a certain inclination relative to the second section 24 and the aperture 28.

Figure 6:
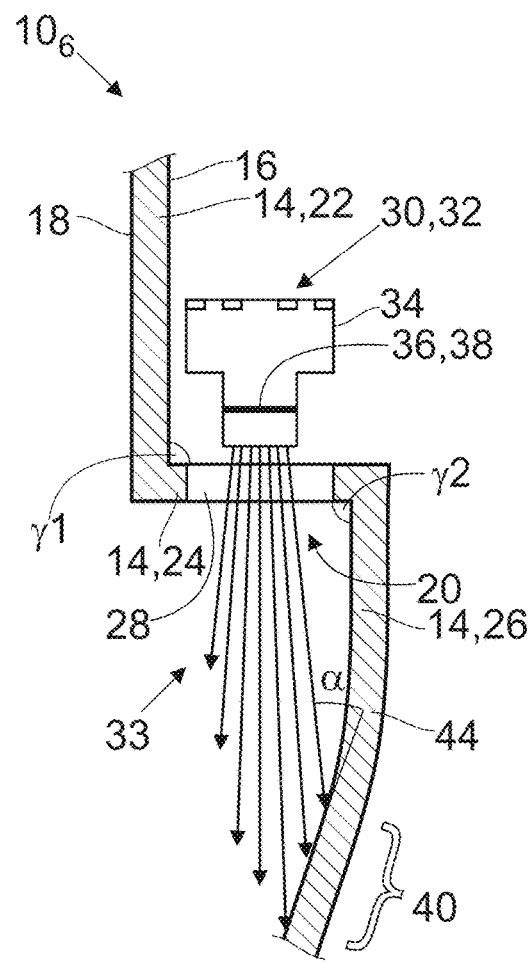
FIG. 6 is a principle sectional view through a sixth embodiment of an external cladding component according to the present disclosure.

FIG. 6 shows a principle sectional view of a sixth embodiment of the external cladding component $10_6$ of the present disclosure. The sixth embodiment of the external cladding component $10_6$ shows a high degree of resemblance with the third embodiment. However, the projector 34 and thus the light source 30 are arranged such that they do not protrude into the aperture 28. Thus the beam of light 33 passes through the aperture 28. In this embodiment the projector 34 is better protected from outer influences like stone chipping or the like.

Figure 7:
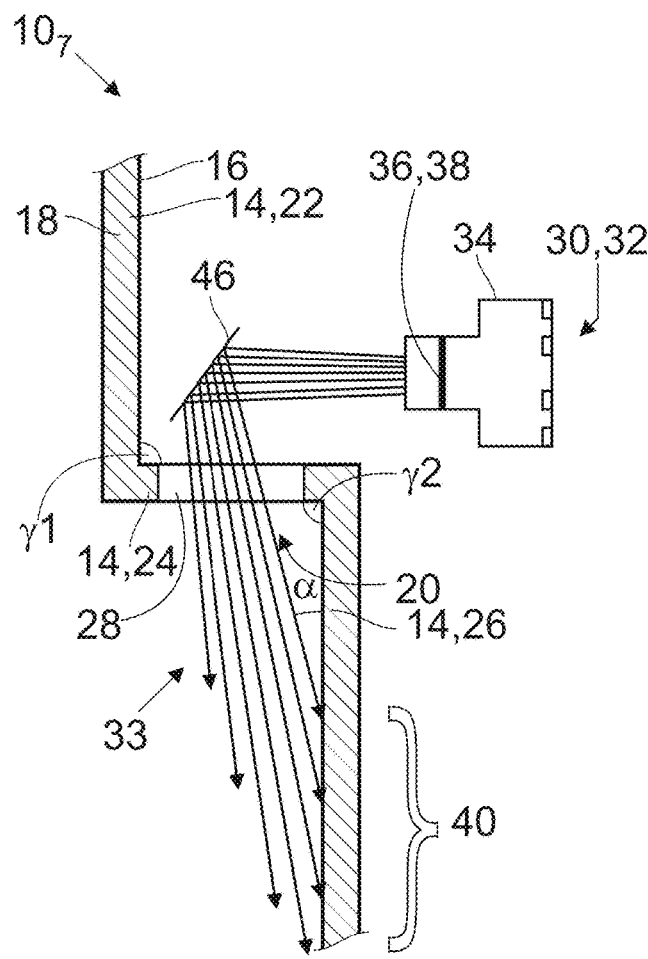
FIG. 7 is a principle sectional view through a seventh embodiment of an external cladding component according to the present disclosure.

In the seventh embodiment of the external cladding component $10_7$ of the present disclosure that is shown in FIG. 7, the external cladding component $10_7$ comprises an optical unit 46 that deflects the beam of light 33. The optical unit 46 may comprise a mirror or a prism. In this case the optical unit 46 is designed such that an acceptably high angle of impact α is reached. The light source 30 and the projector 34 can be arranged at distance to the aperture 28 thereby being protected from outer influences.

FIGS. 8A and 8B show an eighth embodiment of the external cladding component $10_8$ of the present disclosure. In this embodiment the cladding component $10_8$ does not comprise a recess 20. The cladding component can therefore not be subdivided into the first section 22, the second section 24 and the third section 26.

As in the seventh embodiment, the eighth embodiment comprises the optical unit 46 for deflecting the beam of light 33. Moreover, the optical unit 46 or parts of the same are arranged on a lid 47 by which the aperture 28 can be closed as shown in FIG. 7B. The external cladding component $10_8$ is equipped with a moving unit 48 by which the lid 47 and the optical unit 46 can be moved between a first end position (FIG. 7A) and a second end position (FIG. 7B). Intermediate positions are also possible. As already mentioned, the lid 47 closes the aperture 28 when the lid 47 and the optical unit 46 have reached the second end position. As the beam of light 33 cannot transmit though the aperture 28 anymore, the light source 30 is turned off. In the first end position, the lid 47 and the optical unit 46 are at a maximum distance from the light source 30 and the projector 34. By moving the lid 47 and the optical unit 46, the illumination section 40 is also moving. Dynamic effects can be implemented.

FIG. 9 shows a principle top view on a vehicle 12 comprising a number of external cladding components 10 of the present disclosure. The external cladding components 10 of the vehicle 12 are embodied as two front bumpers 50, one rear bumper 52, side skirts 54, B-pillar claddings 56 and a tailgate 62.

The vehicle 12 is equipped with a control unit 58 that is communicating with a plurality of sensors 60. For this purpose the sensors 60 are connected with the control unit 58 by wires 59. The control unit 58 is further connected with the light sources 30 or the projectors 34 of the mentioned external cladding components 10 by wires 59. For the sake of clarity, only the wires 59 by which the front bumpers 50 are connected with the control unit 58 are shown. It is noteworthy that in FIG. 9 only some of the sensors 60 are shown. Further sensors 60 may be arranged in the rear bumpers 52 or in the other cladding components 10.

In the embodiment shown, the sensors 60 are embodied as radar sensors, lidar sensors, infrared sensors, ultrasound sensors or the like. The surroundings of the vehicle 12 can be observed by these sensors 60 and the status of the vehicle 12 can be determined, e.g., with respect to potential collisions with pedestrians or cyclists. In case the control unit 58 detects a potential collision with a pedestrian the control unit 58 may send a signal to the light sources 30 or the projectors 34 of one or both of the front bumpers 50, the side skirt 54, the rear bumpers 52, the tailgate 62 or the B-pillar cladding that are visible to the pedestrian causing them to project a red flashing light on the second surface 18 thereby warning the pedestrian such that a collision may be prevented.

What is claimed is:

1. An external cladding component of or for a vehicle, comprising,
    a base body having a first surface (C and a second surface, said second surface facing to an exterior of the cladding component,
    an aperture extending through the base body, and
    a light source providing a beam of light,
        wherein the light source is at least partially arranged within the aperture and protruding from the second surface, or the beam of light is running through the aperture,
        wherein the beam of light at least partially impinges on an illumination section provided by the second surface,
        wherein the cladding component comprises protrusions arranged on the second surface within the illumination section on which the beam of light at least partially impinges, said protrusions generating a light pattern on the second surface.

2. The external cladding component according to claim 1, wherein the beam of light forms an angle of impact (α) with the illumination section that is larger than 0° and smaller than 360°.

3. The external cladding component according to claim 2, wherein the angle of impact (α) with the illumination section is between 1° and 90°.

4. The external cladding component according to claim 1, wherein the external cladding component comprises a curvature which is
    at least partially extending into the illumination section or arranged outside the illumination section.

5. The external cladding component according to claim 1, wherein the aperture is arranged inside a recess of the cladding component.

6. The external cladding component according to claim 1, further comprising an optical unit for deflecting the beam of light.

7. The external cladding component according to claim 6, further comprising a moving unit for moving the optical unit relative to the light source.

8. The external cladding component according to claim 1, wherein the cladding component comprises a lid for closing the aperture.

9. The external cladding component according to claim 7, wherein the lid is movable by the moving unit.

10. The external cladding component according to claim 1, wherein the cladding component comprises color changing means for changing the color of the beam of light.

11. The external cladding component according to claim 1, wherein the light source is integrated into a projector.

12. A vehicle, comprising an external cladding component according to claim 1.

13. The vehicle according to claim 1, further comprising a control unit for controlling the light source, and at least one of the projector and the moving unit.

14. The vehicle according to claim 13, further comprising a number of sensors that interact with the control unit for determining the current status of the vehicle, wherein the light source and/or the projector are controlled depending on the determined status of the vehicle.

* * * * *